(No Model.)
H. MAILLARD.
MACHINE FOR MAKING CANDY.
No. 265,970. Patented Oct. 17, 1882.
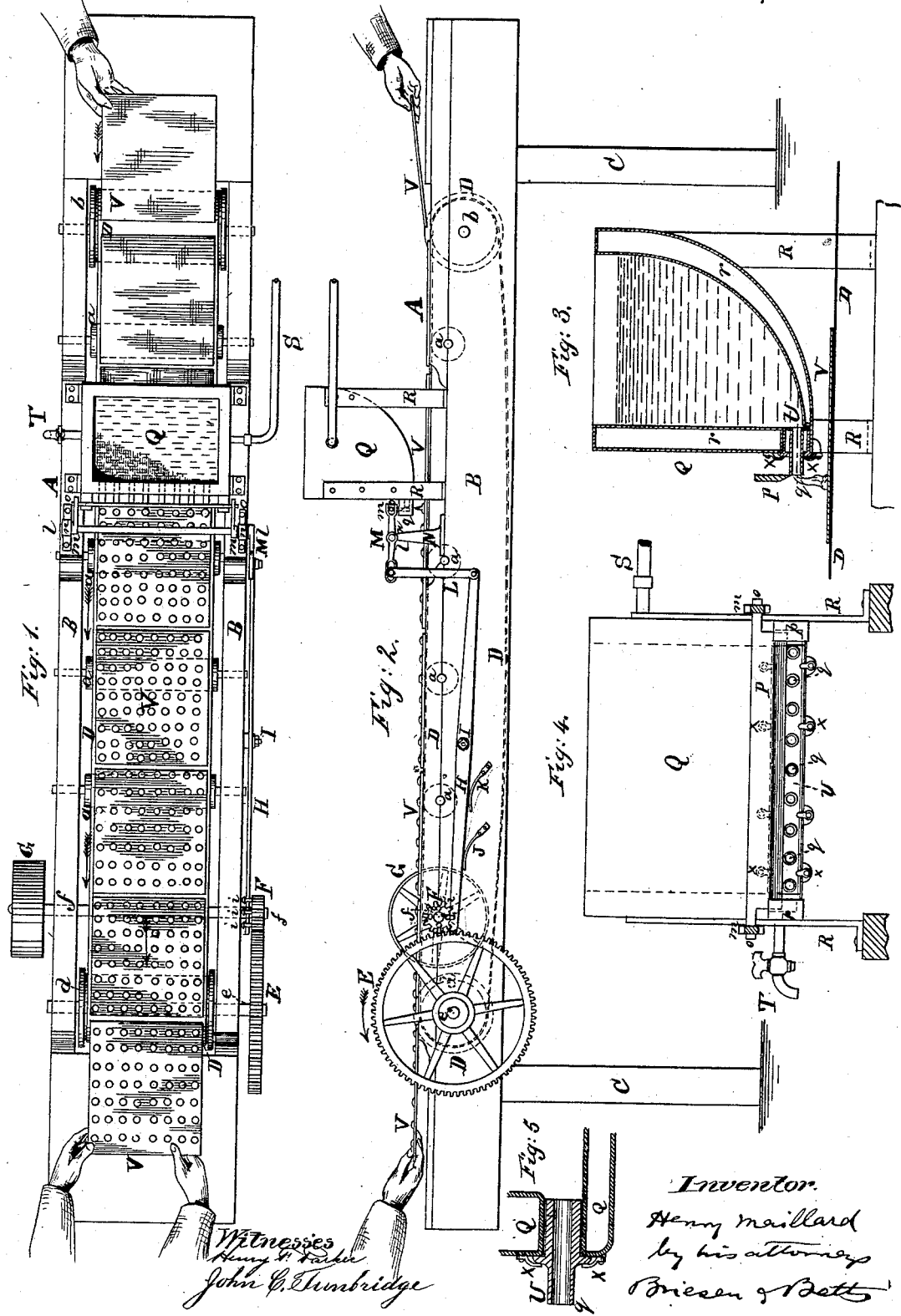
Witnesses
Henry H. Parker
John G. Tunbridge
Inventor
Henry Maillard
by his attorneys
Briesen & Betts

UNITED STATES PATENT OFFICE.

HENRY MAILLARD, OF NEW YORK, N. Y.

MACHINE FOR MAKING CANDY.

SPECIFICATION forming part of Letters Patent No. 265,970, dated October 17, 1882.

Application filed February 3, 1882. (No model.)

*To all whom it may concern:*

Be it known that I, HENRY MAILLARD, of New York, in the county and State of New York, have invented a new and Improved Machine for Making Candy, of which the following is a specification.

Figure 1 is a plan view of my improved machine. Fig. 2 is a side view of the same. Fig. 3 is a vertical section of the tank from which my machine is fed, showing its outlet and the cutting-blade in front thereof, also in section. Fig. 4 is a front view of said tank and cutting-blade. Fig. 5 is a vertical section showing a modified form of the outlets from the tank.

My invention relates to an improved machine for rapidly and accurately cutting the material of which candies are made, while in a plastic state, into separate drops or pieces of desired size, and conveying them off in such a way that they may cool and harden into the desired shapes.

Hitherto the operation of making candy drops, pieces, or disks of various kinds has been as follows: The molten or semi-liquid sugar or other material from which the candy drops are to be made is placed by the workman in an open vessel provided at one portion of its edge with a projecting lip. This vessel is then so turned that the material will flow slowly out over this lip through one or more openings, and the workman, with a knife, chips or cuts off the drops as they hang for a moment over the lip, thus forming successively a number of separate candy-drops; but this method is obviously very slow, requires a most expert workman, and does not give uniform and accurate results. My machine performs mechanically what has heretofore been done only by hand, as above described, and does the work with vastly increased rapidity and success, producing series of drops or pieces simultaneously.

My invention consists of a tank provided with a series of outlets, and made with double walls connected with pipes for the introduction of steam between the walls and its discharge.

It also consists in so arranging a cutting-blade connected with mechanism by which it is actuated that the blade moves in front of the outlets of the tank to cut the substances emerging therefrom.

It also consists in the mechanism for actuating this blade, and in a revolving belt passing under the tank and blade, and of various details of construction and combination of parts, all as hereinafter more particularly described.

In the drawings, the letter A denotes a frame or support, consisting of two parallel side pieces, B B, and supported by legs C C. Between the sides B B are a series of small rollers or wheels, $a\ a\ a$, and two larger rollers or wheels, $b$ and $d$, one at each end of the series, all running freely on gudgeons or shafts that are hung in the sides B B. Over these wheels $a\ b\ d$ passes an endless belt, D, adapted to carry trays V V V, placed on it at one end of the machine and removed at the other end, as shown in the drawings. The wheel $d$ is rigidly attached to the shaft $e$, by which it is held, and turns with it. The shaft $e$ also supports outside the frame A a cog-wheel, E, which is adjusted to fit the cog-wheel F, rigidly fixed on a shaft, $f$, that is hung in the side pieces, B B. To the other end of this shaft $f$ is fixed the pulley-wheel G, which may be connected by belting or otherwise with the motive power, so that when the pulley-wheel G is turned the shaft $f$ and cog-wheel F revolve with it, and, the teeth of the wheel F gearing in those of the wheel E, the latter revolves also, turning the shaft $e$ and wheel or roller $d$, and thus turning the endless band D in the direction of the arrows shown in Fig. 1; or the wheel E may be turned by hand to revolve the band D by means of a crank attached to the shaft $e$ and adapted to turn it, or by other suitable means.

The cog-wheel F is provided with pins $i\ i\ i$, projecting horizontally to a little distance from its surface and placed at regular distances apart. The cog-wheel F is so arranged that when it is turned the pins $i$ successively strike against the end of a bar, H, which is held to one side, B, of the frame by the pivotal connection I, on which it turns freely. The end of the bar I against which the pins $i$ act is forced downward by each successive contact against the force of one or more springs, J and K, or equivalent weight, which throw the bar into its normal position to meet the next pin $i$ as soon as one of the pins $i$ has passed from contact with the bar. Thus an oscillating movement of the bar H is produced, and the vertical bar L pivoted to it is moved up and down and acts by a pivotal connection upon a horizontal bar, M, rigidly attached to the shaft $l$, which hangs in bearings $n$ on the top of supports N, that stand on the rails B. The oscillating movement of the bar H is thus transmitted to the bar M. This bar M, as it moves up and down, acts to oscillate the cross-shaft $l$, upon which it is mounted.

To the shaft $l$ are rigidly connected the arms or cranks $m$ $m$, one near each end of the shaft. These arms $m$ are made with open slotted or forked ends, which fit over projections $o$ $o$, extending from each end of the cutting-knife P. This knife slides up and down in vertical grooves or channels formed in front of the tank Q by plates $p$ $p$, and moves in front of the openings $q$ $q$ $q$, that are formed in the face of the tank, near the bottom thereof. These openings run across in form of tubes or apertures in a removable bar, U, fitting closely into the tank, but capable of being removed and another bar with different-sized openings substituted, if desired.

The bar U shown in Fig. 3 has a series of pipes passing through and fastened in it, while the modified form of bar shown in Fig. 5 is made in one solid piece, with openings $q$ through it at intervals. The bar is slipped into a space left at the bottom of the vertical wall of the tank, and fits tightly therein, being held in place by the buttons X X or other suitable fastening.

The tank Q is supported on the frame A by standards R, or in other convenient manner, and is preferably made with a sloping bottom, as shown in the drawings, and also with a double wall, leaving a space, $r$, between the two walls. This space is intended to be filled with steam or any heated liquid by means of the pipe S passing through the outer wall, so that a steam-jacket is formed, keeping the contents of the tank heated. The steam is conveyed away from the tank by the pipe T, having a suitable cock, said pipe preferably extending from the bottom of the tank.

The operation of my machine is as follows: The molten sugar or other mixture having been put into the tank Q, steam is allowed to enter and fill the hollow walls thereof through the pipe S. The pulley-wheel G being then set in motion, the cog-wheel F acts to move the wheel E, and thus the endless band D is revolved in the direction of the arrows, and whatever is placed on that band is carried the length of the frame. The pins on the cog-wheel F strike the bar H as that wheel revolves, giving the bar the oscillating motion which is transmitted through the mechanism described and shown, to make the cutting-knife P move up and down close in front of the openings in the tank through which the molten mixture flows, as shown in Fig. 3. The knife at each downward stroke cuts off as many drops or chips of the flowing mixture as there are holes $q$, the cut-off pieces corresponding also in size to the size of the openings $q$ $q$. These detached drops or pieces fall upon the trays V, carried under the tank and knife by the endless band D, and are conveyed off on these trays, which are thereafter removed from the revolving band and put aside until the candy drops or pieces shall have cooled and solidified.

I do not claim anything exhibited in Patent No. 185,498.

I claim—

1. In a machine for making candy, the tank Q, made with hollow walls $r$, and provided with pipes S and T for the introduction of steam within such walls and its discharge therefrom, and also with a series of outlets, $q$, that traverse the steam-space, substantially as shown and described.

2. In a machine for making candy, the combination of a tank provided with series of outlets, a cutting-blade, and mechanism for actuating the same in front of said outlets, and a moving table or belt passing under said tank and blade, all substantially as and for the purposes described.

3. In a machine for making candy, the combination of the table A, provided with rollers $a$ $b$ $d$, over which passes an endless belt, D, with the wheel E, arranged to revolve said belt, and with the pulley-wheel G, cog-wheel F, pivoted bar H, moved by said wheel F and spring or springs J K, and with the pivoted bars L and M, shaft $l$, and crank $m$, transmitting the movement of the bar H to the blade P, and with the blade P and tank Q, all substantially as and for the purposes described.

4. The combination of the following elements: the pulley-wheel G, shaft $f$, on which it is fixed, and cog-wheel F, fixed on the same shaft and provided with pins $i$, the pivoted bar H, arranged to be moved by the impact of said pins $i$ on it against the force of the spring or springs J K, the pivoted bars L and M, and the shaft $l$ and crank $m$, arranged to communicate the motion of the bar H to the blade P, the blade P, and tank Q, all substantially as and for the purposes described.

5. The tank Q combined with mechanism, with which it is connected, for heating its contents, and with the removable bar U, having series of apertures, through which the contents of the tank can escape, substantially as herein shown and described.

HENRY MAILLARD.

Witnesses:
D. DEVENYNS,
WILLY G. E. SCHULTZ.